(12) United States Patent
Mansutti et al.

(10) Patent No.: US 7,023,692 B2
(45) Date of Patent: Apr. 4, 2006

(54) MULTIFUNCTIONAL ELECTRONIC PALMTOP COMPUTER

(75) Inventors: Silvano Mansutti, Padua (IT); Roberto Cardin, Padua (IT)

(73) Assignee: 4P S.R.L., Padua (IT)

( * ) Notice: Subject to any disclaimer, the term of this patent is extended or adjusted under 35 U.S.C. 154(b) by 853 days.

(21) Appl. No.: 09/738,964

(22) Filed: Dec. 18, 2000

(65) Prior Publication Data

US 2001/0003071 A1    Jun. 7, 2001

Related U.S. Application Data

(63) Continuation of application No. PCT/EP99/04222, filed on Jun. 17, 1999.

(30) Foreign Application Priority Data

Jun. 19, 1998    (IT)    ............... PD980067 U

(51) Int. Cl.
    *G06F 1/16*    (2006.01)
(52) U.S. Cl. ............... 361/683; 455/558; 708/100
(58) Field of Classification Search ........ 361/683–686; 312/223.1–223.6; 708/100; 455/556.1, 455/557, 558
    See application file for complete search history.

(56) References Cited

U.S. PATENT DOCUMENTS 6,049,813 A * 4/2000 Danielson et al. .......... 708/100
6,718,182 B1 * 4/2004 Kung ...................... 455/556.1

FOREIGN PATENT DOCUMENTS

| DE | A-43 20683 | 1/1994 |
|----|------------|--------|
| EP | A-0 656 600 | 6/1995 |
| FR | A-2 669 131 | 5/1992 |
| WO | A-96 38925 | 12/1996 |

\* cited by examiner

*Primary Examiner*—Hung Van Duong
(74) *Attorney, Agent, or Firm*—Guido Modiano; Albert Josif; Daniel O'Byrne

(57) ABSTRACT

A multifunctional electronic palmtop computer comprising, in a single box-like body, a keyboard (14), a display (15), a CPU, working storage and mass storage, a printer and a PCMCIA card interface (23), further comprising a protective cover (25) for the interface (23) which is provided with locking means adapted to prevent direct accessibility to the interface.

78 Claims, 6 Drawing Sheets

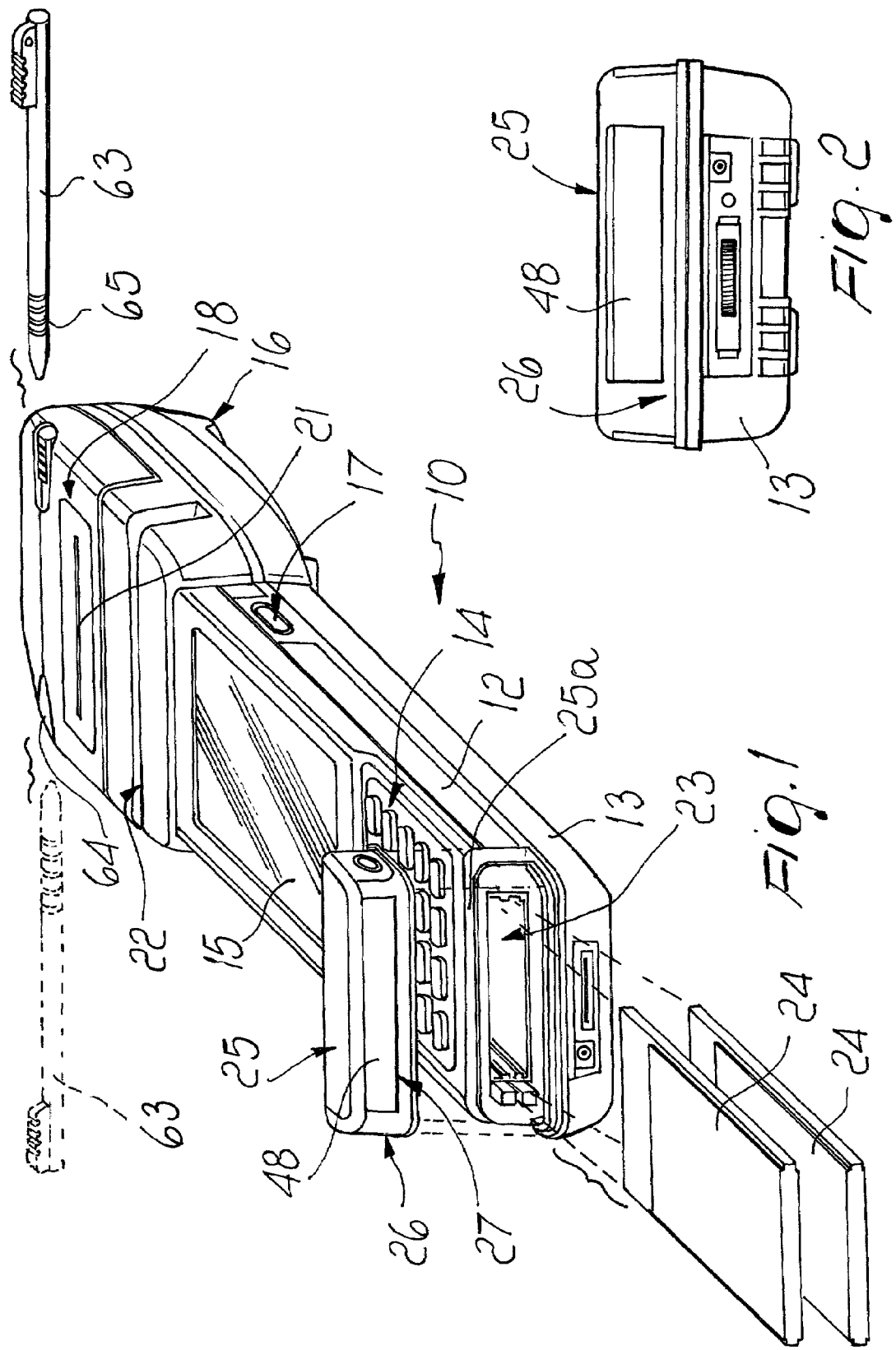

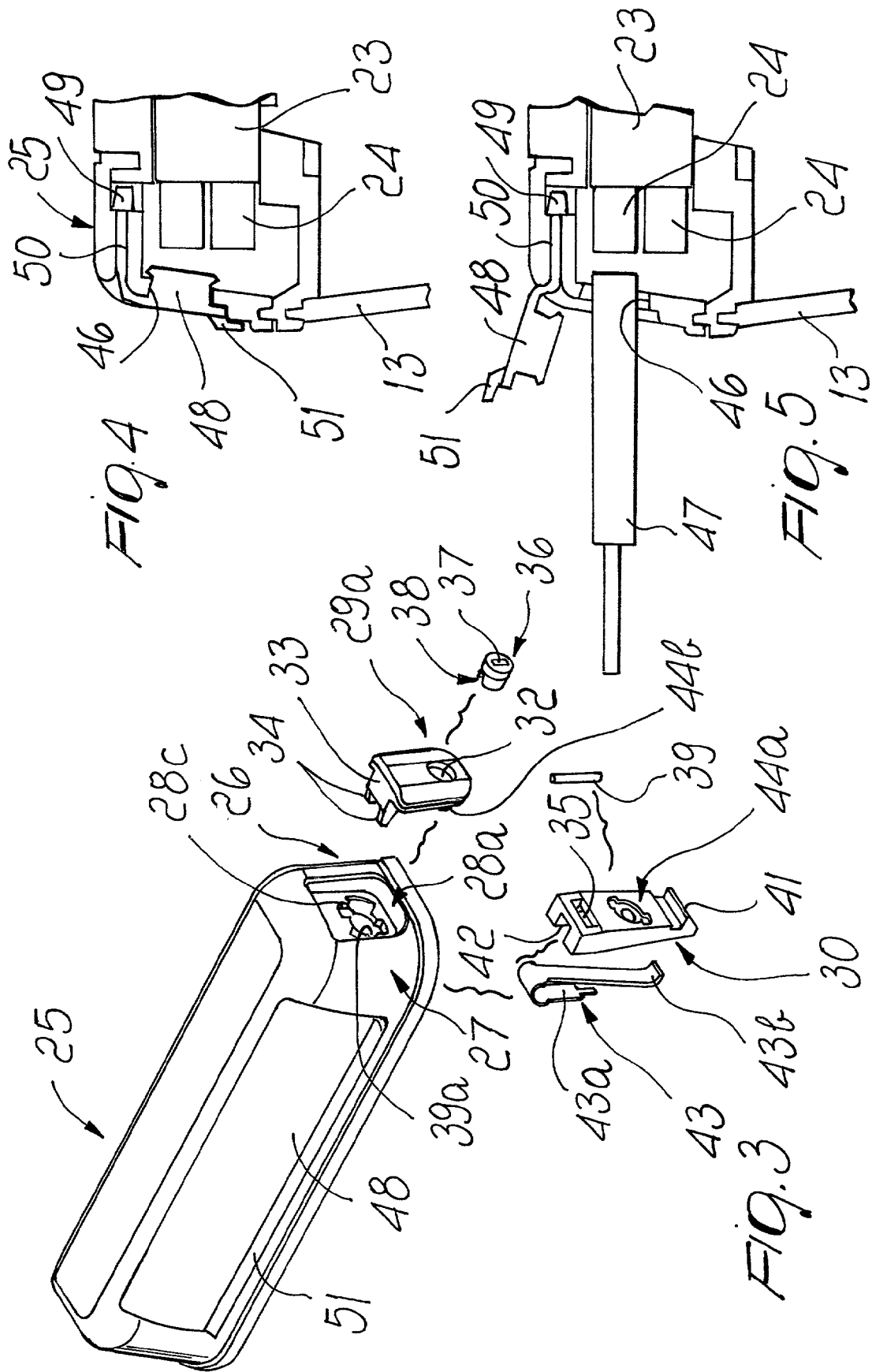

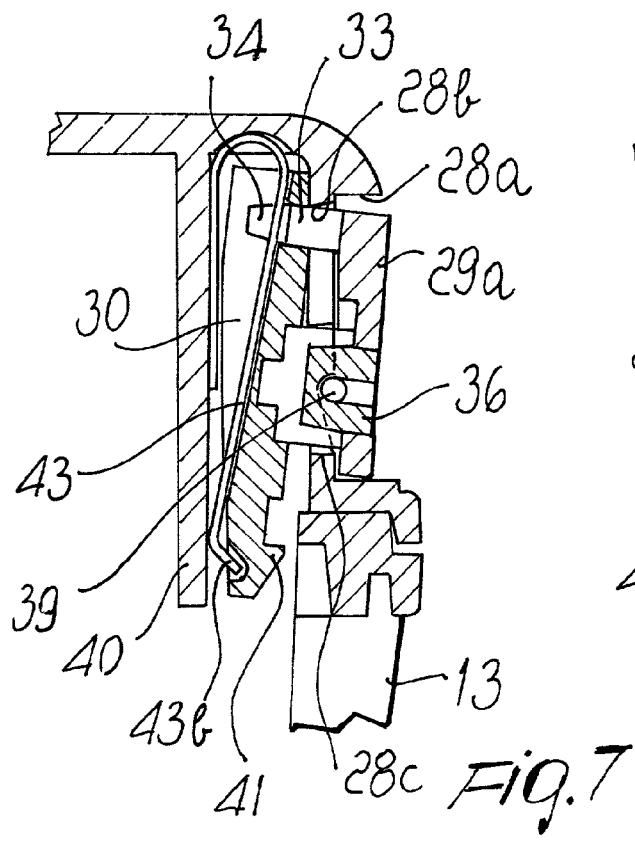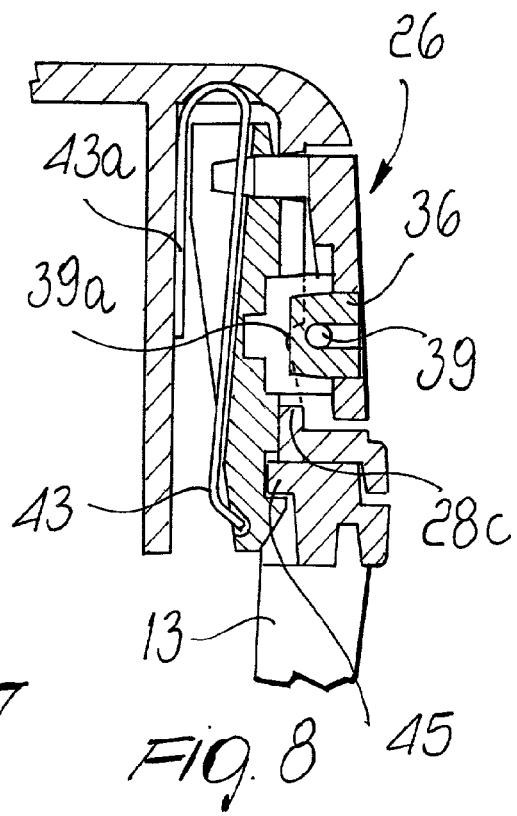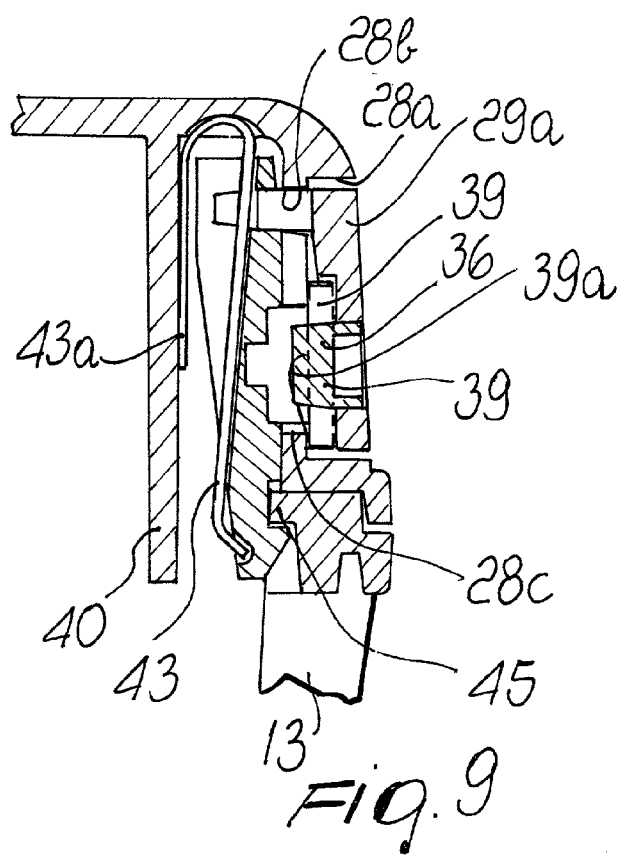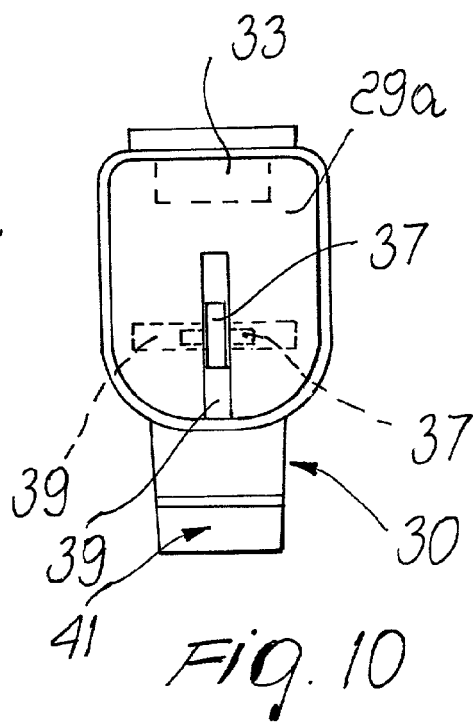

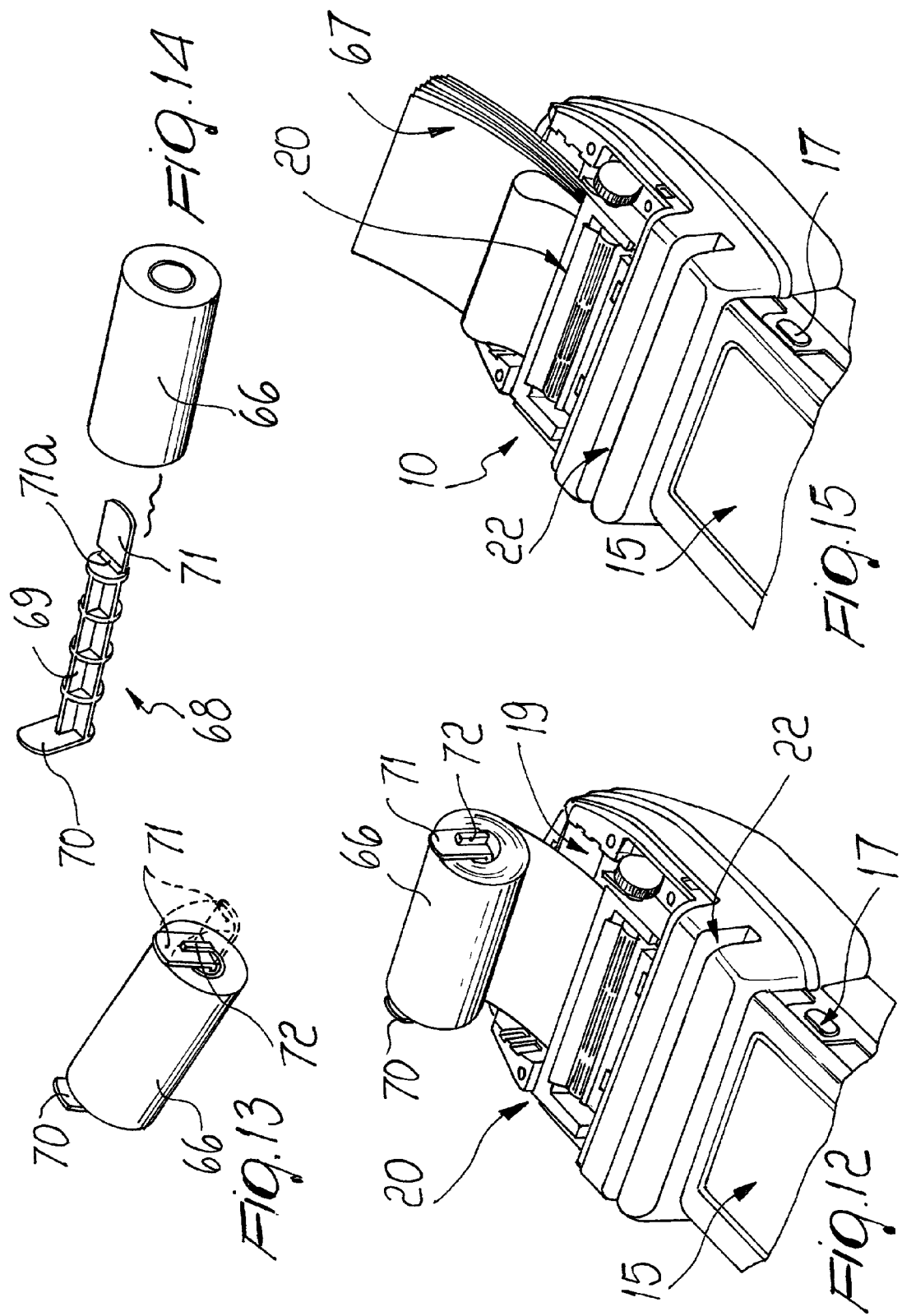

MULTIFUNCTIONAL ELECTRONIC PALMTOP COMPUTER

CROSS-REFERENCE TO RELATED APPLICATIONS

This application is a continuation of application number PCT/EP99/04222 filed on Jun. 17, 1999.

BACKGROUND OF THE INVENTION

The present invention relates to a multifunctional electronic palmtop computer.

Portable electronic computers which allow the operator who uses them to perform a plurality of functions by means of a single structure whose dimensions are so small that it can be comfortably held in the palm of one hand, are commercially rather widespread.

These computers, accordingly known as "palmtops", generally have a visual display, a keyboard, a CPU, working storage and mass storage and, in the more recent configurations, a printer.

Said printer, in particular, can be of the type that prints on paper rolls or on continuous and/or cut paper.

The most valuable feature of this type of computer is certainly that it provides an operator with a plurality of functions by using simply a single device.

One frequent use of a computer of this type is certainly related to sales from mobile points of sale, since all the data and the quantities related to the products ordered by the client can be entered directly, updating in each instance the stock of available products and allowing to issue the freight bill or invoice immediately.

Nowadays there is in fact an ever growing need to integrate these computers as fully as possible, providing them with the highest possible number of functions so as to be able to work by using a single device which is in any case complete with all the tools.

SUMMARY OF THE INVENTION

The aim of the present invention is to provide an electronic palmtop computer which provides and integrates in a single body a plurality of functions which currently require the use of a variety of mutually distinct and separate devices.

Within the scope of this aim, an important object of the present invention is to provide an electronic palmtop computer which, in terms of size, has an extremely compact structure so as to be practical in use.

A further important object of the present invention is to provide an electronic computer which though integrating a plurality of different functions in a single structure ensures a simple operation which requires no particular expertise.

A further important object of the present invention is to provide an electronic palmtop computer which can be produced in practice with equipment and facilities which are conventional in this sector.

A further object of the present invention is to provide an electronic palmtop computer which offers the user greater practicality in use by integrating in a single device a plurality of different functions which currently usually require the use of different devices.

This aim, these objects and others which will become apparent hereinafter are achieved by a multifunctional electronic palmtop computer comprising, in a single boxlike body, a keyboard, a display, a CPU, working storage and mass storage, a printer and a PCMCIA card interface, characterized in that it further comprises a protective cover for said interface which is provided with locking means adapted to prevent direct accessibility to said interface, said cover requiring the intervention of a tool to release said means so as to allow access to said interface.

BRIEF DESCRIPTION OF THE DRAWINGS

Further characteristics and advantages of the present invention will become apparent from the following detailed description of an embodiment thereof, illustrated only by way of non-limitative example in the accompanying drawings, wherein:

FIG. 1 is a perspective view of a multifunctional electronic palmtop computer according to the present invention;

FIG. 2 is a front view of the lower part of the computer of FIG. 1;

FIG. 3 is an exploded view of a detail of the computer of FIG. 1;

FIG. 4 is a sectional view, taken along a longitudinal plane, of a detail of the computer of FIG. 1 in a first operating configuration;

FIG. 5 is a sectional view, taken along a longitudinal plane, of the detail of FIG. 4 in a second operating configuration;

FIGS. 7, 8 and 9 are respective sectional views, taken along the longitudinal plane VII—VII, of the detail of FIG. 6 in various operating steps;

FIG. 10 is a front view of the detail of FIGS. 7, 8 and 9;

FIG. 12 is a perspective view of the computer of FIG. 1 with the printer cover open in a first printing configuration;

FIG. 13 is a perspective view of a detail of the computer of FIG. 12;

FIG. 14 is an exploded view of the detail of FIG. 13;

FIG. 15 is a perspective view of the computer of FIG. 1 with the printer cover open in a second operating configuration.

DESCRIPTION OF THE PREFERRED EMBODIMENTS

Figure 6:
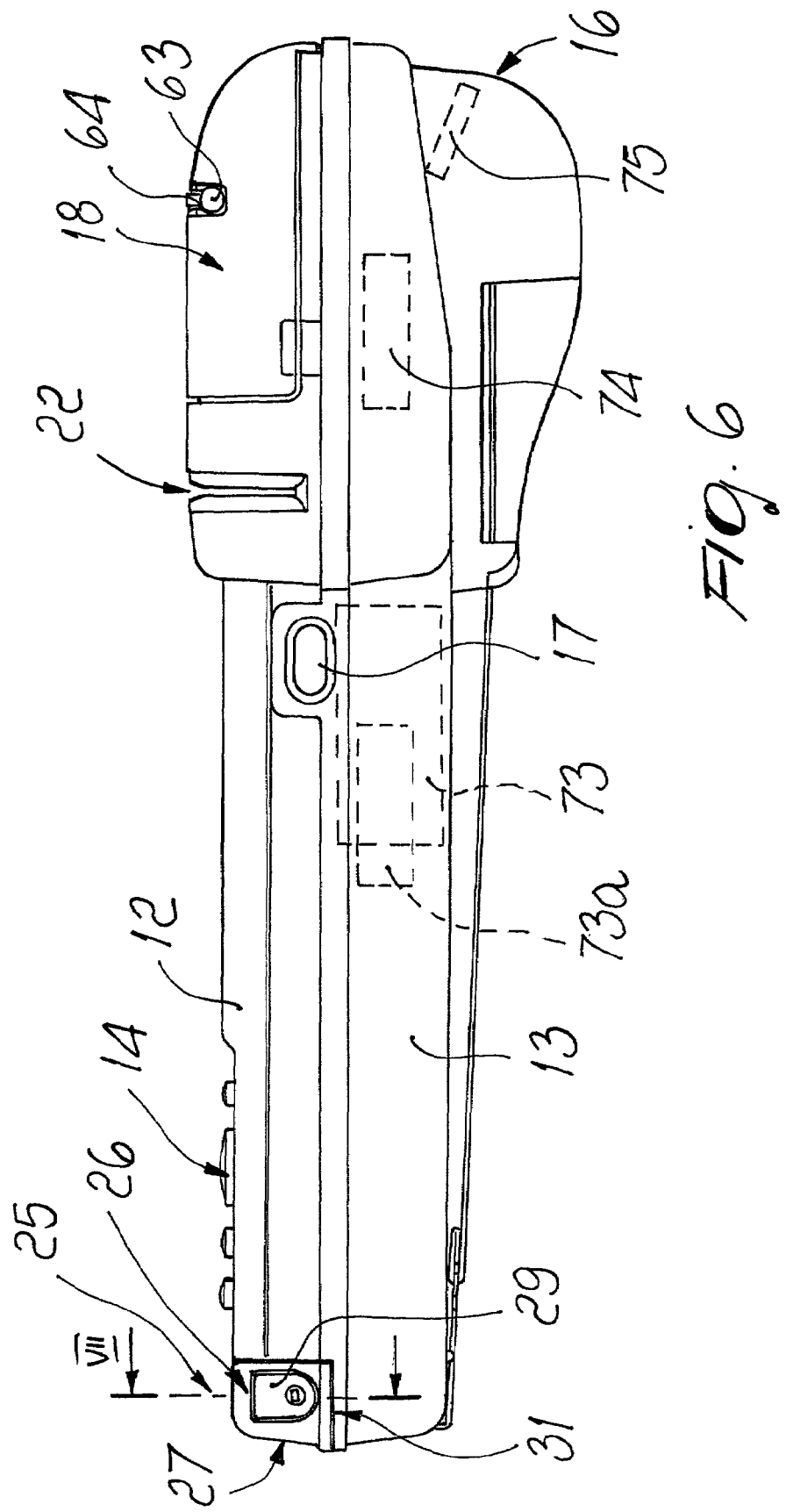
FIG. 6 is a schematic side view of the computer of FIG. 1.
Figure 11:
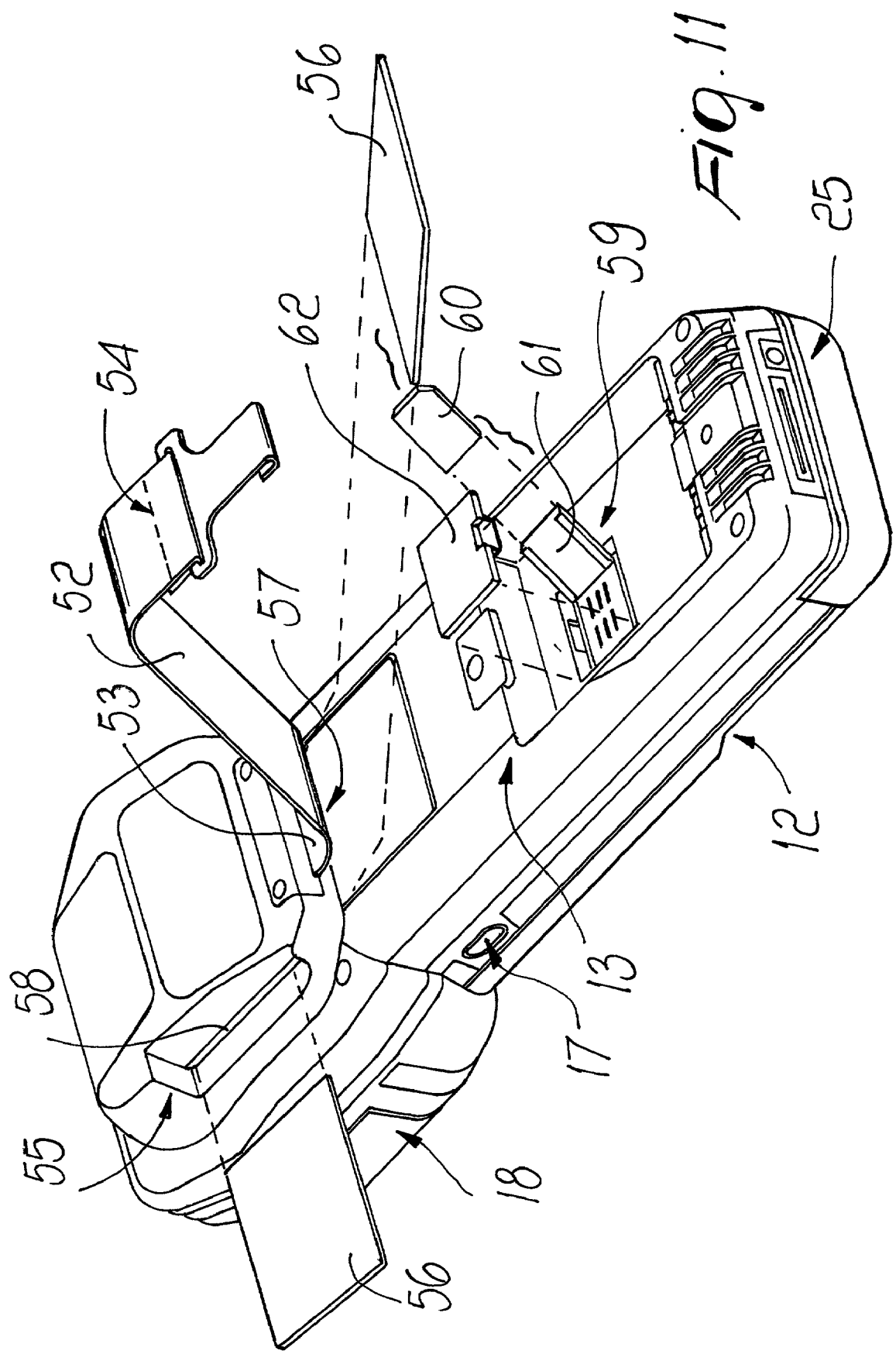
FIG. 11 is a perspective view of the rear part of the computer of FIG. 1.

With reference to the above figures, an electronic palmtop computer according to the invention is generally designated by the reference numeral 10 and comprises a substantially flat and elongated box-like body constituted by the mating of an upper half-shell 12 with a lower half-shell 13.

An electronic board, not shown for the sake of simplicity in the above cited figures, is arranged inside the body 10 and is connected to a keyboard 14 and to a display 15.

In this constructive embodiment, the display 15 is of the type commonly known as "touch-screen", since it is possible to interact with the electronic board simply by touching the surface of the screen with a finger or with a stylus.

For this purpose, the display 15 is covered by an appropriately provided pressure-sensitive film which is not shown for the sake of simplicity.

Computer 10 is provided with adapted software capable of interpreting and recognizing handwriting, corresponding for example to a signature, produced with a slight pressure on the display 15.

The software converts the graphic signs traced by an operator on the display 15 into encoded characters which can be interpreted by any computer program.

Computer 10 has, in this case, a laser scanner 16 of a per se known type, which is arranged in the front part of the body of the computer 10 at the lower half-shell 13 and is adapted for example to read bar codes.

The laser scanner 16 can be operated by a user by means of one of the two buttons 17 arranged on either side of the flat body or by means of the keyboard 14 or, in other cases, by means of a slight pressure on the touch-screen display 15.

Computer 10 has, in the front part of the upper half-shell 12, a paper compartment cover 18 which covers a compartment 19 for containing paper and a printer 20 which is partially visible in FIG. 10.

A slit 21 is formed in said paper compartment cover 18 and the paper can exit through said slit after printing.

In particular, said paper containment compartment 19 is preset, in this case, to contain paper both as continuous forms and as rolls, as described in greater detail hereinafter.

Computer 10 is also provided with a magnetic badge reader 22 of a per se known type which is conveniently located in the front part of the upper half-shell 12.

The printer 20 of the computer can be of the impact or thermal type.

Computer 10 further comprises an interface 23 for PCMCIA cards 24 which is located in the lower part of the upper half-shell 12.

Computer 10 has, in particular, a cover 25 for protecting the interface 23 which has a contoured structure and is adapted to couple, by snap action, to a portion of the profile of the lower half-shell 13.

The cover 25 has a protective wall 27 which is interposed between two parallel fixing shoulders 26 and is meant to be placed in front of said interface 23 in order to prevent direct access thereto.

A seat 28a for a first component 29a of a button 29 is provided on each shoulder 26.

A first opening 28b and a second opening 28c are formed on the face of the seat 28a on which the first component 29a of the button 29 rests; the first and second openings are provided respectively in the upper and central part and are conveniently shaped as described in greater detail hereinafter.

The first component 29a is engaged in the seat 28a and, in combination with a second component 30, constitutes the button 29 for actuating locking means, designated simply by the reference numeral 31 hereinafter, for said cover 25.

The first component 29a is constituted by a substantially flat body which is shaped complementarily to the seat 28a and in which there is a through hole 32; the first component has, at its upper end, a cantilevered tooth 33 with two parallel protrusions 34.

The protrusions are retention elements which are shaped so that they are inserted and glued in a complementarily shaped first seat 35 formed at the upper end of said second component 30, which is conveniently wedge-shaped.

A grub 36 is inserted in the through hole 32 of the first component 29a and has a slot 37 on the face that remains towards the outside and a seat 38 for a pin 39 on the other face.

In this case, the slot 37 and the seat 38 for the pin 39 are parallel and are both diametrical with respect to the grub 36.

The second component 30 is adapted to be placed in the internal part of the cover 25 between the shoulder 26 and a parallel partition 40 which protrudes monolithically from the cover 25.

In particular, the second component 30 is monolithically associated with the first component 29a by means of insertion and gluing of the tooth 33 and of the protrusions 34 in the first seat 35 of the upper end after they have passed through the first opening 28b, which is shaped complementarily thereto.

A cantilevered hook 41 protrudes at the lower end of the second component 30.

A longitudinal hollow 42 is also formed in the second component 30 at the part that is directed toward the internal partition 40; the hollow partially accommodates a fork-shaped flat spring 43.

In particular, the flat spring 43 has a first end 43a which rests against the internal partition 40 and a second end 43b which abuts against the hook-shaped lower end 41 of the second component 30.

A second seat 44a is also formed in the central part of the second component and is adapted to mate with a complementarily shaped tab 44b which protrudes from the inward-looking face of the first component 29a of the button 29 after it has passed through the second opening 28c.

If the pin 39 is arranged horizontally, as shown in FIGS. 7 and 8, by applying to the first component 29a a pressure adapted to push it toward the inside of the cover 25 the pin 39 can be inserted with its ends in complementarily shaped cutouts, designated by the reference numeral 39a, provided on the second opening 28c.

In this manner, the pressure applied to the first component 29a is transmitted to the second component 30 which is monolithically coupled thereto and which, in contrast with the action of the flat spring 43, releases its hook 41 from the retainer 45 constituted by a portion of the upper edge of the lower half-shell 13, thus allowing to open the cover 25.

When the pin 39 is turned through an angle of 90°, so as to arrange it vertically as shown in FIG. 9, it is not possible to insert the ends of the pin in the cutouts 29a of the second opening 28c, so that though applying a pressure to said first component 29a said first component is unable to transmit the pressure to the second component 30 of the button 29 in order to overcome the elastic resistance of the flat spring 43.

In this way, therefore, the hook 41 cannot be disengaged from the retainer 45 and accordingly the cover 25 remains locked so as to close access to the interface 23.

The pin 39 is turned by turning a screwdriver or an equivalent tool with the tip inserted in the slot 37 of the grub 36.

An opening 46 is formed in this case in the wall 27 for protecting the cover 25, and a connector, shown schematically and designated by the reference numeral 47, can be inserted through said opening without having to disengage the cover 25 from the computer 10.

The opening 46 is normally protected by a rubber plug 48 which is joined by means of a protrusion 50 provided with a larger end 49 which engages a cavity formed in the cover 25 so as to be nondetachably coupled to the cover 25.

The plug 48 is externally provided with a raised grip portion 51 which facilitates grip and allows access to only one of the PCMCIA cards 24, as shown in FIGS. 4 and 5.

The presence of the cover 25 prevents direct access to the PCMCIA interface 23; in particular, when the cover is locked it prevents the removal of the PCMCIA cards 24 by unauthorized personnel, despite allowing all the data transfer operations that can be performed by means of the direct connection of said connector 47 to said interface 23.

Two raised portions, not shown for the sake of simplicity, can further be provided inside the cover 25, protecting the PCMCIA cards against sliding out accidentally by virtue of a simple mechanical abutment.

The configuration of the cover 25 is such as to protect the inside more than satisfactorily, since it is substantially waterproof in the presence of water sprays.

It is particularly important to note that the cover 25 prevents access to the interface 23, which in this case is in the lower part of the computer 10, coupling thereto in a very practical manner.

Very simply, once the cover 25 has been rested against the end edge 25a of its seat, formed in the upper half-shell 12, said cover can slide until it couples with a snap action to the portion of the profile of the lower half-shell 13 that lies below it.

In this constructive configuration, the computer 10 has, in the lower half-shell 13, an elastic strap 52 for gripping it having a first fixed end 53 and a second end 54 provided with a disengageable hook.

Computer 10 is also provided with a first read/write device, schematically designated by the reference numeral 55, for microchip cards 56; said device is located at one side in the front region of said lower half-shell 13.

A second read/write device 57 for microchip cards 56 is arranged on the lower face of the body 10, in the region directly below the first end 53 of the strap 52.

In order to insert a microchip card 56 in the second read/write device 57 it is necessary to disengage the second end 54 of the strap 52 and raise it adequately until access to the insertion region is achieved.

Each one of the first and second read/write devices 55 and 57 is adapted for reading and writing microchip cards 56 (commonly termed "smart cards") and is provided with a flexible flap 58 which closes the slot for inserting the microchip cards 56 and is folded only during the insertion of the cards.

A nonlimitative example of the microchip cards 56 is given by cards of the CP8 or ISO 7816 standard types.

The flap 58 acts as a brush for cleaning the microchip card 56 that is inserted, in order to prevent dirt from entering the read/write device and dirtying it or damaging it.

A third read/write device 59 for SIM-type cards, designated by the reference numeral 60, is arranged in the lower half-shell 13 in the part located below the power supply battery pack, which is not shown in FIG. 9 for the sake of simplicity.

The third read/write device 59 is provided with a connector 61 which can be accessed when the SIM-type card 60 is inserted after lifting a cover 62.

The computer 10 is also provided with a stylus 63 to be used for the touch-screen display 15; the stylus is adapted to be inserted in a complementarily shaped seat 64 formed in the paper compartment cover 18.

The stylus 63 has a portion with protrusions 65, so that once it is inserted in the seat 64 it is retained therein by friction.

In particular, the stylus 63 can be inserted in the seat 64 from the left or from the right, so as to allow comfortable and practical use to a left-handed user as well.

The paper containment compartment 19, in this case, can alternatively accommodate a roll 66 and a pack 67 of continuous paper 67, as shown in FIGS. 12, 13, 14 and 15.

It is in fact possible to remove the pack 67 from the compartment 19 in which it had been inserted earlier for printing on continuous paper, as shown in FIG. 15, and to arrange in the part left empty a roll holder 68 which supports a roll 66 (whose maximum outside diameter is 28 mm).

The roll holder 68 is constituted by a pivot 69 which is provided, at one end, with a first fixed flat arm 70 which protrudes at right angles thereto; the holder further has, at its other end, a second flat arm 71 which can be folded by a film hinge 71a.

Each one of the first and second arms 70 and 71 is externally provided with a raised portion 72.

In the operating configuration, the first and second arms 70 and 71 are mutually parallel and cause the roll holder 68 to be U-shaped.

In order to insert the roll 66 in the compartment 19, as shown in FIG. 12, it is necessary to lower the second arm 71 of the roll holder 68 and engage the roll 66 in the pivot 69.

After this has been done, the second arm 71 is returned to the operating configuration and then the roll holder 68, which now supports the roll 66, is inserted in a complementarily shaped seat which is formed in the paper containment compartment 19 in the region in front of the printer 20.

In this way, the user can choose to print on the roll 66 or, as an alternative, on the continuous paper 76, having both already available and without having to perform any intervention.

The U-shaped configuration of the roll holder 68 and therefore the presence of the first and second arms 70 and 71 facilitates the insertion and extraction of the roll 66 and at the same time keeps it locked in position when the paper compartment cover 18 is closed.

In this particular constructive configuration, a cellular telephone is integrated in the computer 10 and in this case is of the type commonly known as GSM.

The telephone comprises an electronic board 73 which is arranged, with particular reference to the arrangement of the computer 10 shown in FIG. 6, with a vertical orientation laterally to the paper containment compartment 19 at the lower half-shell 13.

The electronic board 73 is connected to an antenna 74 which is also arranged laterally to said paper containment compartment 19 in a forward position with respect to the board 73.

The telephone allows a user to immediately transmit, for example, the data related to the delivery of goods at the recipient customer's premises without having to use any other device.

The computer 10 is further completed by integrating therein, in this case, a satellite positioning system, known more commonly as GPS (Global Positioning System), which also comprises an electronic board 73a which is connected to a receiving antenna 75.

In this case, the electronic board 73a for the satellite positioning system is also arranged vertically and laterally to the paper containment compartment 19 on the opposite side with respect to the position of the electronic board 73 of said GSM cellular telephone.

The receiving antenna 75 is instead located in the front part of the body 11 below said paper containment compartment 19, so that when a user needs to use it he/she can receive the signals of the satellite network dedicated to the GPS service.

The present invention is susceptible of numerous modifications and variations, all of which are within the scope of the same inventive concept.

In practice it has been observed that the present invention fully achieves the intended aim and all the intended objects.

First of all, it is important to note that the present invention provides an electronic palmtop computer which is capable of providing and integrating in a single body a plurality of functions for which it is currently necessary to resort to the use of a variety of mutually separate devices.

It is also important to note that the above-described computer has a very compact structure, so as to be extremely practical to use.

A particular advantage is certainly due to the fact that said computer ensures simple operation and that though integrating a plurality of separate functions in a single body it requires no particular technical expertise.

Another advantage is that the above-described computer can be produced in practice with equipment and facilities which are conventional in the field.

The materials employed, so long as they are compatible with the contingent use, may be any according to requirements.

All the details may furthermore be replaced with other technically equivalent elements.

The disclosures in Italian Utility Model Application No. PD98U000067 from which this application claims priority are incorporated herein by reference.

What is claimed is:

1. A multifunctional electronic palmtop computer of the type which comprises, in a single box-like body, a keyboard, a display, a CPU, working storage and mass storage, a printer and a PCMCIA card interface, further comprising a protective cover for said interface which is provided with locking means adapted to prevent direct accessibility to said interface, said cover requiring the intervention of a tool to release said means so as to allow access to said interface, and wherein said locking means are actuated, on mutually opposite sides, by buttons, each button comprising a first component and a second component which are operatively coupled and are respectively arranged externally and internally with respect to a wall of said cover, said second component having a hook which abuts elastically against a retainer which protrudes rigidly from said body, said hook being disengageable from said retainer in contrast with an elastic means by virtue of a pressure applied by a user on said first component and transmitted to said second component.

2. The computer according to claim 1, wherein once one of the sides of said cover is rested against an edge of its seat, said cover can slide until it couples by snap action to the portion of the profile of said seat that constitutes said retainer and lies below it.

3. The computer according to claim 1, wherein said cover comprises means for preventing said PCMCIA cards from accidentally sliding out of the interface.

4. The computer according to claim 1, wherein an opening is formed in said cover and a connector for connection to said PCMCIA card interface can be inserted through it.

5. The computer according to claim 1, comprising a read/write device for microchip cards, which is arranged on the lower face of the body and can be accessed through a slot which has a flexible flap which can be folded only during the insertion of one of said microchip cards.

6. The computer according to claim 1, comprising a seat which is adapted to contain a stylus to be used for said display, said seat being formed in the cover of said printer.

7. The computer according to claim 1, comprising a paper containment compartment and a printer, said compartment alternatively containing a roll of paper supported by a roll holder or a pack of continuous paper.

8. The computer according to claim 1, comprising a cellular telephone.

9. The computer according to claim 1, comprising a satellite positioning system.

10. The computer according to claim 2, wherein a grub is inserted in said first component, on the outward-looking face; a seat for a pin is formed diametrically in said grub and an opening is formed in said wall of said cover which is interposed between said first and second components of the button, said opening forming cutouts for at least partially accommodating the ends of said pin, said pin being adapted to rotate rigidly with said grub in order to reach a specific position in which, by at least partially inserting its ends in said cutouts by virtue of a pressure applied to said first component, said pressure can be transmitted to said second component in contrast with said elastic means so as to disengage said hook from said retainer.

11. The computer according to claim 3, wherein said means for preventing accidental sliding comprise at least one raised portion which protrudes inside said cover and is adapted to ensure mechanical abutment against said PCMCIA cards.

12. The computer according to claim 4, wherein said opening is protected by a rubber plug.

13. The computer according to claim 5, comprising a further read/write device for microchip cards of the type known SIM format, said device being arranged in the part below the power supply battery pack, being protected by a cover and having a connector which is shaped complementarily for the insertion of said SIM-format card.

14. The computer according to claim 7, comprising said roll holder has a U-shaped structure which comprises a pivot provided, at its ends, with a fixed arm and with an arm which can fold by means of a film hinge.

15. The computer according to claim 8, wherein said cellular telephone is of the type known as GSM and comprises an electronic board which is arranged laterally to said paper containment compartment at the lower part of said body, said board being arranged vertically.

16. The computer according to claim 9, wherein said satellite positioning system comprises an electronic board which is arranged laterally with respect to said paper containment compartment at the lower part of said body, said board being arranged vertically.

17. The computer according to claim 10, wherein said grub has, on the face that remains on the outside, a slot in which it is possible to insert the point of said tool so as to turn it in order to orientate said pin.

18. The computer according to claim 12, wherein said plug is provided with a protrusion which is rigidly fixed to said cover.

19. The computer according to claim 14, wherein said arms of the roll holder are flat.

20. The computer according to claim 15, wherein said cellular telephone comprises an antenna which is connected to said electronic board and is arranged laterally with respect to said paper containment compartment, in a forward position with respect to said board.

21. The computer according to claim 16, wherein said satellite positioning system comprises a receiving antenna which is connected to said electronic board and is arranged in the front part of said body below said paper containment compartment.

22. The computer according to the claim 17, wherein said elastic means is a fork-shaped flat spring which is interposed between a partition that lies inside said cover and said second component.

23. The computer according to claim 18, wherein said plug is externally provided with a raised grip portion.

24. The computer according to claim 22, wherein a longitudinal hollow is formed in said second component on the side directed toward said internal partition, said hollow partially accommodating said flat spring.

25. The computer according to claim 24, wherein a tab protrudes from the inward face of said first component and is adapted to be inserted in a complementarily shaped seat formed in said second component on the opposite side with respect to said longitudinal hollow, said opening formed in the wall of the cover that is interposed between said first component and said second component being provided with said cutouts for the ends of said pin and being crossed by said tab.

26. The computer according to claim 25, wherein a cantilevered tooth protrudes from one end of said first component and has two parallel protrusions which constitute retention elements which can be inserted in a complementarily shaped seat formed in a corresponding end of said second component.

27. A multifunctional electronic palmtop computer of the type which comprises, in a single box-like body, a keyboard, a display, a CPU, working storage and mass storage, a printer and a PCMCIA card interface, further comprising a protective cover for said interface which is provided with locking means adapted to prevent direct accessibility to said interface, said cover requiring the intervention of a tool to release said means so as to allow access to said interface, wherein an opening is formed in said cover and a connector for connection to said PCMCIA card interface can be inserted through it.

28. The computer according to claim 27, wherein said locking means are actuated, on mutually opposite sides, by buttons, each button comprising a first component and a second component which are operatively coupled and are respectively arranged externally and internally with respect to a wall of said cover, said second component having a hook which abuts elastically against a retainer which protrudes rigidly from said body, said hook being disengageable from said retainer in contrast with an elastic means by virtue of a pressure applied by a user on said first component and transmitted to said second component.

29. The computer according to claim 27, wherein said cover comprises means for preventing said PCMCIA cards from accidentally sliding out of the interface.

30. The computer according to claim 27, wherein said opening is protected by a rubber plug.

31. The computer according to claim 27, comprising a read/write device for microchip cards, which is arranged on the lower face of the body and can be accessed through a slot which has a flexible flap which can be folded only during the insertion of one of said microchip cards.

32. The computer according to claim 27, comprising a seat which is adapted to contain a stylus to be used for said display, said seat being formed in the cover of said printer.

33. The computer according to claim 27, comprising a paper containment compartment and a printer, said compartment alternatively containing a roll of paper supported by a roll holder or a pack of continuous paper.

34. The computer according to claim 27, comprising a cellular telephone.

35. The computer according to claim 27, comprising a satellite positioning system.

36. The computer according to claim 28, wherein once one of the sides of said cover is rested against an edge of its seat said cover can slide until it couples by snap action to the portion of the profile of said seat that constitutes said retainer and lies below it.

37. The computer according to claim 29, wherein said means for preventing accidental sliding comprise at least one raised portion which protrudes inside said cover and is adapted to ensure mechanical abutment against said PCMCIA cards.

38. The computer according to claim 30, wherein said plug is provided with a protrusion which is rigidly fixed to said cover.

39. The computer according to claim 33, comprising said roll holder has a U-shaped structure which comprises a pivot provided, at its ends, with a fixed arm and with an arm which can fold by means of a film hinge.

40. The computer according to claim 39, wherein said arms of the roll holder are flat.

41. The computer according to claim 35, wherein said satellite positioning system comprises an electronic board which is arranged laterally with respect to said paper containment compartment at the lower part of said body, said board being arranged vertically.

42. The computer according to claim 36, wherein a grub is inserted in said first component, on the outward-looking face; a seat for a pin is formed diametrically in said grub and an opening is formed in said wall of said cover which is interposed between said first and second components of the button, said opening forming cutouts for at least partially accommodating the ends of said pin, said pin being adapted to rotate rigidly with said grub in order to reach a specific position in which, by at least partially inserting its ends in said cutouts by virtue of a pressure applied to said first component, said pressure can be transmitted to said second component in contrast with said elastic means so as to disengage said hook from said retainer.

43. The computer according to claim 38, wherein said plug is provided with a protrusion which is rigidly fixed to said cover.

44. The computer according to claim 34, wherein said cellular telephone comprises an antenna which is connected to said electronic board and is arranged laterally with respect to said paper containment compartment in a forward position with respect to said board.

45. The computer according to claim 41, wherein said satellite positioning system comprises a receiving antenna which is connected to said electronic board and is arranged in the front part of said body below said paper containment compartment.

46. The computer according to claim 42, wherein said grub has, on the face that remains on the outside, a slot in which it is possible to insert the point of said tool so as to turn it in order to orientate said pin.

47. The computer according to claim 43, comprising a further read/write device for microchip cards of the type known as SIM format, said device being arranged in the part below the power supply battery pack, being protected by a cover and having a connector which is shaped complementarily for the insertion of said SIM-format card.

48. The computer according to claim 44, wherein said cellular telephone comprises an antenna which is connected to said electronic board and is arranged laterally with respect to said paper containment compartment, in a forward position with respect to said board.

49. The computer according to the claim 46, wherein said elastic means is a fork-shaped flat spring which is interposed between a partition that lies inside said cover and said second component.

50. The computer according to claim 49, wherein a longitudinal hollow is formed in said second component on the side directed toward said internal partition, said hollow partially accommodating said flat spring.

51. The computer according to claim 50, wherein a tab protrudes from the inward face of said first component and is adapted to be inserted in a complementarily shaped seat formed in said second component on the opposite side with respect to said longitudinal hollow, said opening formed in the wall of the cover that is interposed between said first component and said second component being provided with said cutouts for the ends of said pin and being crossed by said tab.

52. The computer according to claim 51, wherein a cantilevered tooth protrudes from one end of said first component and has two parallel protrusions which constitute retention elements which can be inserted in a complementarily shaped seat formed in a corresponding end of said second component.

53. A multifunctional electronic palmtop computer of the type which comprises, in a single box-like body, a keyboard, a display, a CPU, working storage and mass storage, a printer and a PCMCIA card interface, further comprising a protective cover for said interface which is provided with locking means adapted to prevent direct accessibility to said interface, said cover requiring the intervention of a tool to release said means so as to allow access to said interface, further comprising a paper containment compartment, said compartment alternatively containing a roll of paper supported by a roll holder or a pack of continuous paper.

54. The computer according to claim 53, wherein said locking means are actuated, on mutually opposite sides, by buttons, each button comprising a first component and a second component which are operatively coupled and are respectively arranged externally and internally with respect to a wall of said cover, said second component having a hook which abuts elastically against a retainer which protrudes rigidly from said body, said hook being disengageable from said retainer in contrast with an elastic means by virtue of a pressure applied by a user on said first component and transmitted to said second component.

55. The computer according to claim 53, wherein said cover comprises means for preventing said PCMCIA cards from accidentally sliding out of the interface.

56. The computer according to claim 53, wherein an opening is formed in said cover and a connector for connection to said PCMCIA card interface can be inserted through it.

57. The computer according to claim 53, comprising a read/write device for microchip cards, which is arranged on the lower face of the body and can be accessed through a slat which has a flexible flap which can be folded only during the insertion of one of said microchip cards.

58. The computer according to claim 53, comprising a seat which is adapted to contain a stylus to be used for said display, said seat being formed in the cover of said printer.

59. The computer according to claim 53, comprising said roll holder has a U-shaped structure which comprises a pivot provided, at its ends, with a fixed arm and with an arm which can fold by means of a film hinge.

60. The computer according to claim 53, comprising a cellular telephone.

61. The computer according to claim 53, comprising a satellite positioning system.

62. The computer according to claim 54, wherein once one of the sides of said cover is rested against an edge of its seat, said cover can slide until it couples by snap action to the portion of the profile of said seat that constitutes said retainer and lies below it.

63. The computer according to claim 55, wherein said means for preventing accidental sliding comprise at least one raised portion which protrudes inside said cover and is adapted to ensure mechanical abutment against said PCMCIA cards.

64. The computer according to claim 56, wherein said opening is protected by a rubber plug.

65. The computer according to claim 57, comprising a further read/write device for microchip cards of the type known as SIM format, said device being arranged in the part below the power supply battery pack, being protected by a cover and having a connector which is shaped complementarily for the insertion of said SIM-format card.

66. The computer according to claim 59, wherein said arms of the roll holder are flat.

67. The computer according to claim 60, wherein said cellular telephone is of the type known as GSM and comprises an electronic board which is arranged laterally to said paper containment compartment at the lower part of said body, said board being arranged vertically.

68. The computer according to claim 61, wherein said satellite positioning system comprises a electronic board which is arranged laterally with respect to said paper containment compartment at the lower part of said body, said board being arranged vertically.

69. The computer according to claim 62, wherein a grub is inserted in said first component, on the outward-looking face; a seat for a pin is formed diametrically in said grub and an opening is formed in said wall of said cover which is interposed between said first and second components of the button, said opening forming cutouts for at least partially accommodating the ends of said pin, said pin being adapted to rotate rigidly with said grub in order to reach a specific position in which, by at least partially inserting its ends in said cutouts by virtue of a pressure applied to said first component, said pressure can be transmitted to said second component in contrast with said elastic means so as to disengage said hook from said retainer.

70. The computer according to claim 64, wherein said plug is provided wit a protrusion which is rigidly fixed to said cover.

71. The computer according to claim 67, wherein said cellular telephone comprises a antenna which is connected to said electronic board and is arranged laterally with respect to said paper containment compartment, in a forward position with respect to said board.

72. The computer according to claim 68, wherein said satellite positioning system comprises a receiving antenna which is connected to said electronic board and is arranged in the front part of said body below said paper containment compartment.

73. The computer according to claim 69, wherein said grub has, on the face that remains on the outside, a slot in which it is possible to insert the point of said tool so as to turn it in order to orientate said pin.

74. The computer according to claim 70, wherein said plug is externally provided with a raised grip portion.

75. The computer according to the claim 73, wherein said elastic means is a fork-shaped flat spring which is interposed between a partition that lies inside said cover and said second component.

76. The computer according to claim 75, wherein a longitudinal hollow is formed in said second component on the side directed toward said internal partition, said hollow partially accommodating said flat spring.

77. The computer according to claim 76, wherein a tab protrudes from the inward face of said first component and is adapted to be inserted in a complementarily shaped seat formed in said second component on the opposite side with respect to said longitudinal hollow, said opening formed in the wall of the cover that is interposed between said first component and said second component being provided with said cutouts forte ends of said pin and being crossed by said tab.

78. The computer according to claim 77, wherein a cantilevered tooth protrudes from one end of said first component and has two parallel protrusions which constitute retention elements which can be inserted in a complementarily shaped seat formed in a corresponding end of said second component.

* * * * *